United States Patent
Kobayashi et al.

(10) Patent No.: US 8,098,310 B2
(45) Date of Patent: Jan. 17, 2012

(54) IMAGING APPARATUS AND IMAGE SIGNAL PROCESSING METHOD

(75) Inventors: Hirokazu Kobayashi, Saitama (JP); Daisuke Kusuda, Miyagi (JP); Masaya Tamaru, Miyagi (JP); Michio Cho, Saitama (JP); Kazuya Oda, Miyagi (JP)

(73) Assignee: FujiFilm Corporation, Tokyo (JP)

( * ) Notice: Subject to any disclaimer, the term of this patent is extended or adjusted under 35 U.S.C. 154(b) by 423 days.

(21) Appl. No.: 12/395,366

(22) Filed: Feb. 27, 2009

(65) Prior Publication Data

US 2009/0219425 A1   Sep. 3, 2009

(30) Foreign Application Priority Data

Feb. 28, 2008   (JP) .................................. P2008-48055

(51) Int. Cl.
*H04N 5/335* (2011.01)
(52) U.S. Cl. ........................................................ 348/294
(58) Field of Classification Search .................. 348/294, 348/302, 362, 370, 371
See application file for complete search history.

(56) References Cited

U.S. PATENT DOCUMENTS

| | | | |
|---|---|---|---|
| 6,278,490 B1 * | 8/2001 | Fukuda et al. | ................ 348/362 |
| 7,030,923 B2 | 4/2006 | Ide et al. | |
| 7,098,946 B1 | 8/2006 | Koseki et al. | |
| 2006/0245014 A1 | 11/2006 | Haneda | |
| 2007/0189753 A1 | 8/2007 | Koguchi et al. | |

FOREIGN PATENT DOCUMENTS

| | | |
|---|---|---|
| JP | 2000-92378 A | 3/2000 |
| JP | 2001-275044 A | 10/2001 |
| JP | 2002-40321 A | 2/2002 |
| JP | 2006-311240 A | 11/2006 |
| JP | 2007-256907 A | 10/2007 |

* cited by examiner

*Primary Examiner* — Joseph P Martinez
(74) *Attorney, Agent, or Firm* — Birch, Stewart, Kolasch & Birch, LLP

(57) ABSTRACT

An imaging apparatus includes an imaging device, an imaging device deriving unit and a signal processing unit. Pixels of the imaging device include a first pixel group and a second pixel group. The imaging device driving unit exposes the first pixel group during a first exposure period, exposes the second pixel group during a second exposure period, and reads first image data captured by the first pixel group and second image data captured by the second pixel group separately. The signal processing unit performs image processing for the first and second image data. A first shooting mode and a second shooting mode are provided. In the first shooting mode, the signal processing unit performs the image processing for the first and second image data separately to generate two pieces of subject image data. In the second shooting mode, the signal processing unit combines the first and second image data.

6 Claims, 11 Drawing Sheets

IMAGING APPARATUS AND IMAGE SIGNAL PROCESSING METHOD

CROSS-REFERENCE TO RELATED APPLICATIONS

This application is based upon and claims the benefit of priority from the Japanese Patent Application No. 2008-48055 filed on Feb. 28, 2008, the entire contents of which are incorporated herein by reference.

BACKGROUND OF THE INVENTION

1. Technical Field

The invention relates to an imaging apparatus equipped with a solid-state imaging device and an image signal processing method used in the imaging apparatus. Particularly, the invention relates to an imaging apparatus that can capture an image of a subject with a wide dynamic range and that can capture continuous two images (e.g. a flashed image and a non-flashed image) in one shooting operation, and an image signal processing method used in the imaging apparatus.

2. Related Art

A solid-state imaging device such as a CCD image sensor or a CMOS image sensor having at least millions of pixels mounted on one chip has become popular recently with the advance of increase in the number of pixels. For this reason, the quantity of signal charges allowed to be stored in each pixel has been reduced to a very small value in accordance with reduction in the size of each pixel, so that there is a tendency for an overexposed or underexposed image to be captured and for the dynamic range of a subject image to be narrowed.

In a digital camera described in JP 2001-275044 A (corresponding to U.S. Pat. No. 7,030,923), pixels are separated into a group of pixels to be exposed for a long time and a group of pixels to be exposed for a short time so that a composite image is generated by combining subject image data obtained by the long-time exposure and image data obtained subject image data obtained by the short-time exposure to thereby achieve enlargement of the dynamic range.

In a digital camera described in JP 2007-256907 A (corresponding to US 2007/0189753 A), two shooting operations (i.e. flashed image capturing and non-flashed image capturing) are performed continuously in one release operation in order to reduce the probability of failed image capturing.

JP 2001-275004 A does not consider timings at which flashlight should be emitted in the long-time exposure and the short-time exposure when it is required to capture a flashed subject image.

In JP 2007-256907 A, there is a time difference between the two kinds of shooting, so that there is a problem that image capturing may be failed because facial expression will become poor in spite of good brightness or brightness will become poor in spite of good facial expression if a main subject moves or facial expression changes in the time difference.

SUMMARY OF THE INVENTION

The invention provides an imaging apparatus and an image signal processing method that can eliminate a time difference between two continuous pictures (e.g. a flashed image or a non-flashed image) and that can widen the dynamic range of a subject image when the subject image is captured as a flashed image.

According to an aspect of the invention, an imaging apparatus includes a solid-state imaging device, an imaging device driving unit and a signal processing unit. The solid-state imaging device includes a plurality of pixels that are formed and arranged as a two-dimensional array in a surface of a semiconductor substrate. The plurality of pixels include a first pixel group having pixels that are arranged cyclically, and a second pixel group being different from the first pixel group and having pixels that are arranged cyclically. The imaging device driving unit exposes the first pixel group during a first exposure period, exposes the second pixel group during a second exposure period that is a part of the first exposure period, and reads from the solid-state imaging device first image data captured by the first pixel group and second image data captured by the second pixel group separately. The signal processing unit performs image processing for the first and second image data read from the solid-state imaging device. A first shooting mode and a second shooting mode are provided. In the first shooting mode, the signal processing unit performs the image processing for the first and second image data separately to generate two pieces of subject image data, and. In the second shooting mode, the signal processing unit combines the second image data with the first image data to generate one piece of subject image data.

Also, an image signal processing method for use in the imaging apparatus includes causing the imaging apparatus to operate the first shooting mode or the second shooting mode.

Also, the imaging apparatus and the image signal processing method may emit flashlight during a period in which the first exposure period does not overlap with the second exposure period when the imaging apparatus operates in the first shooting mode, may emit flashlight during a period in which the first exposure period overlaps with the second exposure period when the imaging apparatus operates in the second shooting mode.

Also, when the flashlight is emitted, the signal processing unit, the imaging apparatus and the image signal processing method may correct the second image data with a gain that is equal to or larger than a temporal ratio of the second exposure period to the first exposure period.

Also, when the flashlight is emitted, the signal processing unit, the imaging apparatus and the image signal processing method may calculate a differential image between the two pieces of subject image data when the two pieces of subject image data are obtained in the first shooting mode.

Also, the imaging apparatus and the image signal processing method may combines the two pieces of subject image data based on the differential image to generate one piece of subject image data.

Also, the imaging apparatus and the image signal processing method may calculate distances to respective image parts based on the differential image and combines the two pieces of subject image data by using a mixture ratio corresponding to the calculated distances.

Also, the imaging apparatus may further include a mode selection switch that selects one mode from the first and second shooting modes.

Also, the imaging apparatus may further include a mechanical shutter that terminates the first and second exposure periods simultaneously.

According to the invention, the probability of failed image capturing can be reduced and a composite image with a wide dynamic range can be created even when flashlight is emitted.

DETAILED DESCRIPTION OF EMBODIMENTS OF THE INVENTION

Embodiments of the invention will be described below with reference to the accompanying drawings.

Figure 1:
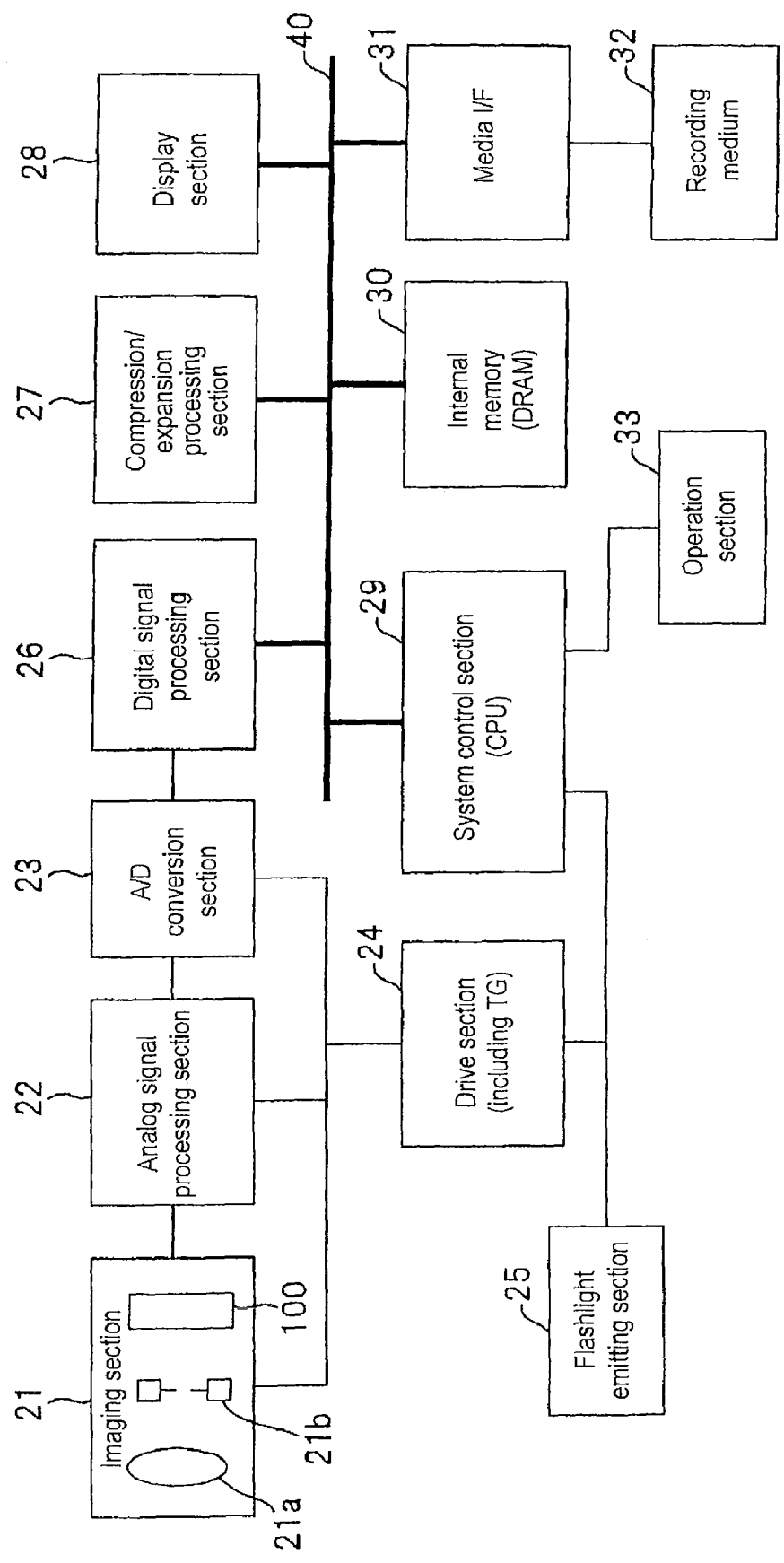
FIG. 1 is a functional block diagram of a digital camera according to a first embodiment of the invention.
}

FIG. 1 is a functional block diagram showing the configuration of a digital camera according to a first embodiment of the invention. This digital camera includes an imaging section 21, an analog signal processing section 22, an analog-to-digital (A/D) conversion section 23, a drive section (including a timing generator TG) 24, and a flashlight emitting section 25. The analog signal processing section 22 performs analog processing such as auto gain control (AGC), correlated double sampling, etc. for analog image data output from the imaging section 21. The A/D conversion section 23 converts the analog image data output from the analog signal processing section 22 into digital image data. The drive section 24 performs drive control of the A/D conversion section 23, the analog signal processing section 22 and the imaging section 21 in accordance with an instruction issued from a system control section (CPU) 29 which will be described later. The flashlight emitting section 25 emits flashlight in accordance with an instruction issued from the CPU 29.

The imaging section 21 has an optical lens system 21a, an aperture diaphragm, a mechanical shutter 21b, and a CCD imaging device 100. The optical lens system 21a collects light from a subject field. The aperture diaphragm limits the light, which has passed through the optical lens system 21a. The CCD imaging device 100 receives the light collected by the optical lens system 21a and limited by the aperture diaphragm, and outputs captured image data (analog image data).

The digital camera according to this embodiment further includes a digital signal processing section 26, a compression/expansion processing section 27, a display section 28, the system control section (CPU) 29, an internal memory 30 such as a frame memory, a media interface (I/F) section 31, and a bus 40. The digital signal processing section 26 receives the digital image data output from the A/D conversion section 23 and performs digital signal processing such as interpolation, white balance correction, RGB/YC conversion, etc. for the digital image data. The compression/expansion processing section 27 compresses the image data into image data of a JPEG format or the like or expands image data of a JPEG format into the original image data. The display section 28 displays a menu, etc. or displays a through image (live-view image) or a captured image. The system control section 29 generally controls the digital camera as a whole. The media I/F section 31 performs an interface process with a recording medium 32 in which JPEG image data, etc. are stored. The sections 26 to 31 are connected to one another through the bus 40. In addition, an operation section 33 (including a two-step shutter release button and a mode selection switch which will be described later) for inputting a user's instruction is connected to the system control section 29.

Figure 2:
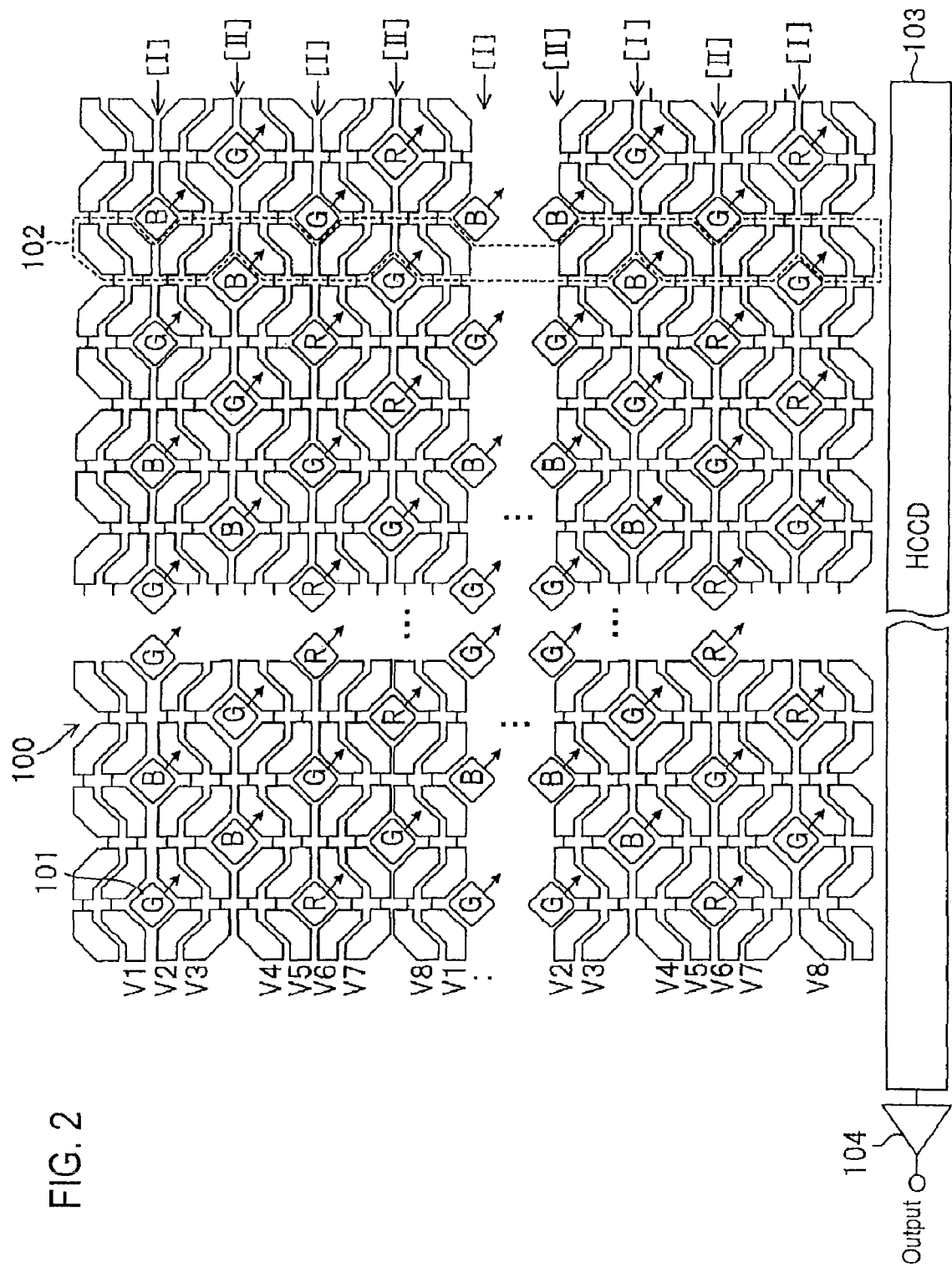
FIG. 2 is a schematic view of a surface f a solid-state imaging device shown in FIG. 1.

FIG. 2 is a schematic plan view of the solid-state imaging device 100 shown in FIG. 1. In the solid-state imaging device 100 shown in FIG. 2, a large number of photodiodes (photoelectric conversion elements) 101 are formed in a semiconductor substrate so as to be arranged as a two-dimensional array (so called honeycomb pixel array) in which photodiodes 101 in even-numbered rows are shifted by a ½ pitch from photodiodes 101 in odd-numbered rows, respectively.

"R", "G" or "B" shown on each photodiode 101 in FIG. 2 represents a color (Red=R, Green=G and Blue=B) of a color filter laminated on each photodiode. Each photodiode 101 stores a signal charge having a quantity corresponding to the quantity of received light of one of the three primary colors.

Vertical transfer electrodes are laid on a surface of the semiconductor substrate so as to extend in a horizontal direction of the surface of the semiconductor substrate and in a zigzag manner to avoid the respective photodiodes 101. Embedded channels not shown but embedded in side portions of photodiode columns that are arranged vertically on the semiconductor substrate are formed to extend vertically in a zigzag manner to avoid the photodiodes 101. The embedded channels and the vertical transfer electrodes, which are provided thereon to extend vertically in the zigzag manner, make up vertical transfer paths (VCCD) 102.

A horizontal transfer path (HCCD) 103 is provided in a lower side portion of the semiconductor substrate. This horizontal transfer path 103 is likewise made up of embedded channels and horizontal transfer electrodes provided thereon. This horizontal transfer path 103 is two-phase driven by transfer pulses output from the drive section 24. An amplifier 104 is provided in an output terminal portion of the horizontal transfer path 103 so that the amplifier 104 outputs a voltage value signal corresponding to the quantity of signal charges, as a captured image signal.

Although description has been made by use of the terms "vertical" and "horizontal", these terms merely mean "one direction" along the surface of the semiconductor substrate and "another direction substantially perpendicular to the one direction".

In the solid-state imaging device 100 shown in FIG. 2, the photodiodes (pixels) 101 are arranged as the so-called honeycomb pixel array. This array is formed in such a manner that a first pixel group [I] arranged as a tetragonal lattice array and a second pixel group [II] arranged as a tetragonal lattice array are laid to overlap with each other while vertically and horizontally shifted by a ½ pitch from each other. In addition, RGB color filters are arranged as the Bayer array on the first pixel group, while RGB color filters are arranged as the Bayer array on the second pixel group.

Accordingly, in the solid-state imaging device 100 according to this embodiment, arrangement of color signals read from the first pixel group and arrangement of color signals read from the second pixel group are the same but shifted by a ½ pitch from each other.

Figure 3:
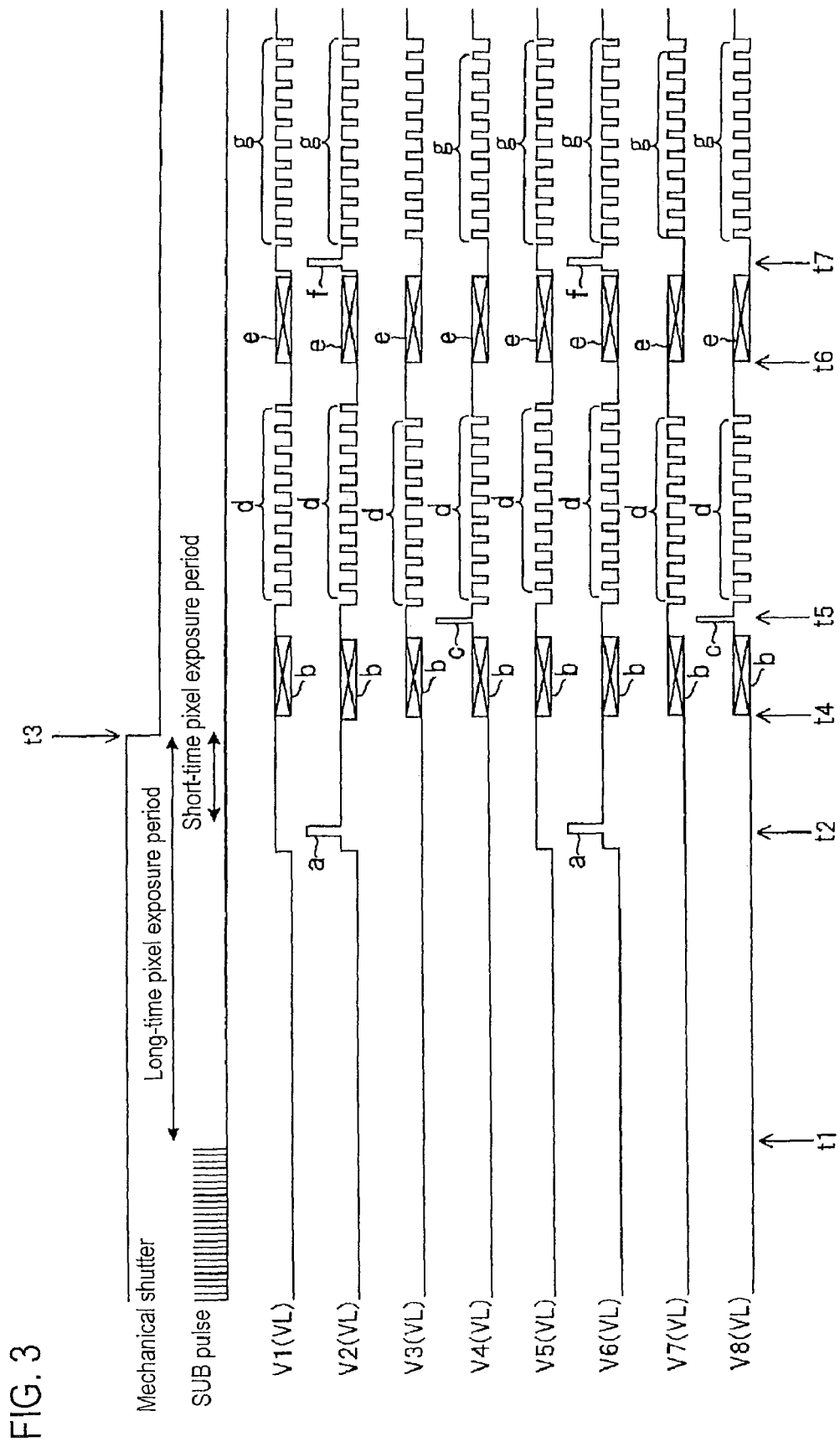
FIG. 3 is a time chart showing driving of the solid-state imaging device shown in FIG. 2.

FIG. 3 is a time chart showing driving of the solid-state imaging device shown in FIG. 2. In the solid-state imaging device 100 according to this embodiment, captured image signals of the first pixel group and captured image signals of the second pixel group can be read in accordance with an instruction issued from the CPU 29 shown in FIG. 1, with being discriminated from each other.

That is, in a state where pulses (SUB pulses) are continuously applied to the semiconductor substrate of the solid-state imaging device 100 under the condition that the mechanical shutter is "open", there is no charge stored in each pixel because charge stored in each pixel 101 has been discarded to the semiconductor substrate side.

When the SUB pulse is turned off at time t1, exposure of the respective pixels 101 is started (an exposure period started at the time t1 will be hereinafter referred to as "long-time exposure period" (first exposure period)), so that it is started to store signal charges.

When a read pulse "a" is applied to the transfer electrodes V2 and V6 (shown in FIG. 2) serving as read electrodes at predetermined time t2, the charges stored in the first pixel group [I] is read to the vertical charge transfer paths 102 while the first pixel group [I] begins to store new signal charge. That is, exposure of the first pixel group [I] is started at this time t2 (an exposure period started at this time t2 will be hereinafter referred to as "short-time exposure period" (second exposure period)).

When the mechanical shutter is "shut" at next time t3, both the long-time exposure and the short-time exposure are turned off simultaneously so the exposure of the first pixel group [I] is terminated and the exposure to the second pixel group [II] is terminated. Because the mechanical shutter is used for blocking light when the exposure is terminated, the influence of smearing can be avoided.

When the vertical charge transfer paths 102 are driven based on a high-speed sweep pulse "b" at time t4 after the mechanical shutter is "shut", unnecessary charges in the vertical charge transfer paths 102 inclusive of the signal charge read based on the read pulse "a" at the time t2 is swept out.

At next time t5, a read pulse "c" is applied to the transfer electrodes V4 and V8 serving as read electrodes. In this manner, the signal charges stored in the second pixel group [II] are read to the vertical charge transfer paths 102. This signal charges are read from the solid-state imaging device 100 in accordance with transfer pulses "d".

The signals (captured image data) read from the solid-state imaging device 100 are fetched into the digital signal processing section 26 via the analog signal processing section 22 and the A/D conversion section 23 shown in FIG. 1, so that image processing is performed for the signals.

At time t6 after the captured image data of the second pixel group [II] is read, the vertical charge transfer paths 102 are driven again in accordance with a high-speed sweep pulse "e". When a read pulse "f" is applied to the transfer electrodes V2 and V6 serving as read electrodes at time t7, signal charges are read from the first pixel group [I] to the vertical charge transfer paths 102 and then output from the solid-state imaging device 100 in accordance with transfer pulses "g". Image processing is performed for the signal charges in the same manner as described above.

In this manner, in the solid-state imaging device 100 according to this embodiment, captured image data of the first pixel group (hereinafter may be referred to as short-time exposure pixel group) and captured image data of the second pixel group (hereinafter may be referred to as long-time exposure pixel group) are read separately.

In the digital camera according to this embodiment, two modes which will be described below are provided so that a user can select one mode from the two modes by using the operation section 33. One of the two modes is a high-sensitivity double shooting mode for generating one piece of captured image data from the long-time exposure data read from the long-time exposure pixel group while generating another piece of captured image data from the short-time exposure data read from the short-time exposure pixel group. The other mode is a wide dynamic range shooting mode for generating one piece of captured image data by combining the two pieces of captured image data.

Figure 4:
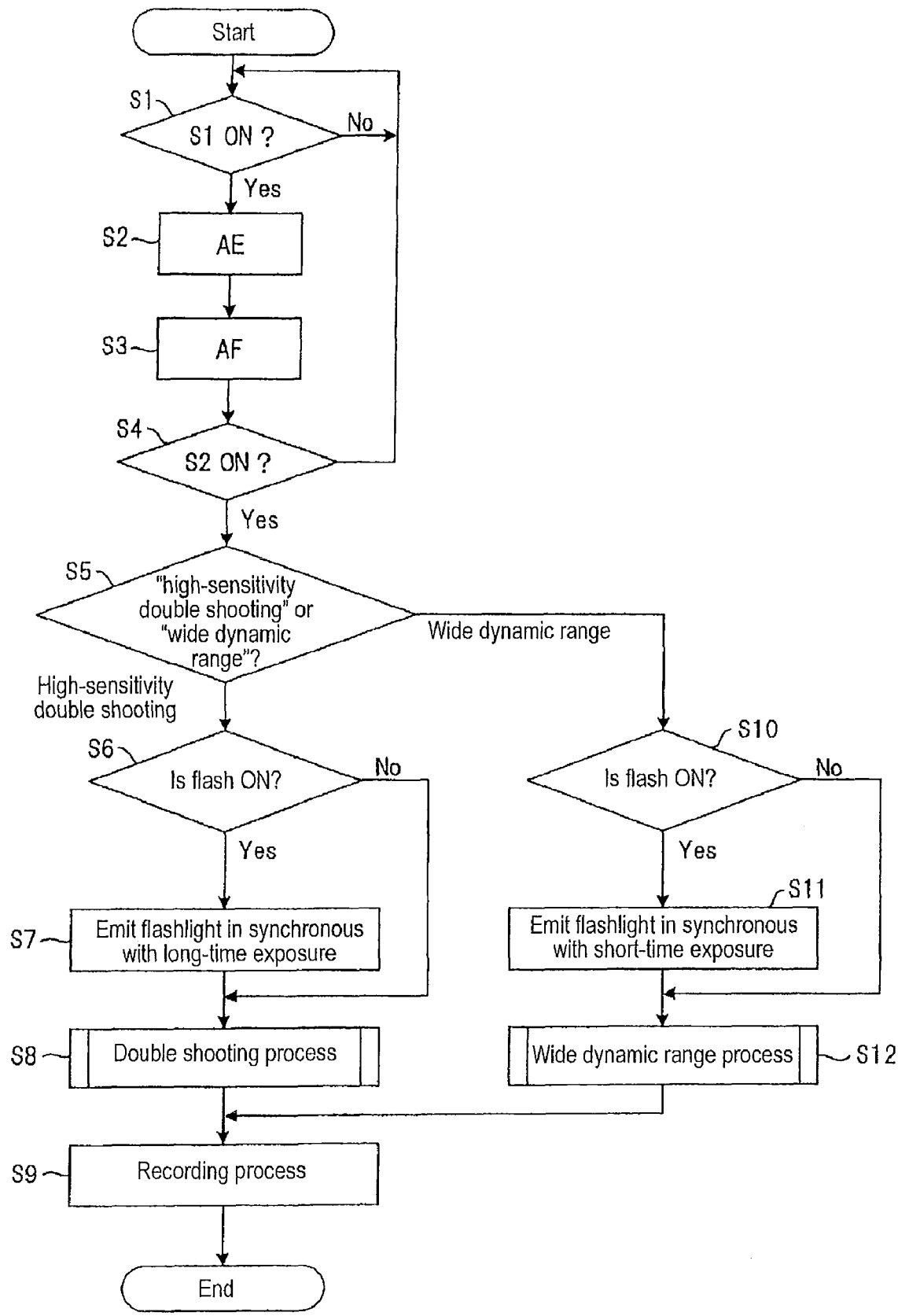
FIG. 4 is a flow chart showing an image capturing procedure in the digital camera shown in FIG. 1.

FIG. 4 is a flow chart showing an image capturing procedure executed by the CPU 29 shown in FIG. 1 with use of the drive section 24, the digital signal processing section 26, etc. which work under the CPU 29. First, it is determined as to whether or not an S1 switch (half push) of the two-step shutter release button included in the operation section 33 is ON (step S1). When the S1 switch is ON, auto exposure (AE) control and automatic focusing (AF) control are performed in the next steps S2 and S3, respectively. Then, in step S4, it is determined as to whether or not an S2 switch (full push) of the two-step shutter release button is ON. When either of the determination made in the steps S1 and S4 results in NO, the procedure goes back to the step S1.

When the determination made in the step S4 results in "full push" (YES), the procedure then goes to step S5 in which it determined as to whether the shooting mode designated by the user's instruction via the operation section 33 is a "high-sensitivity double shooting mode" or a "wide dynamic range shooting mode".

Figure 5:
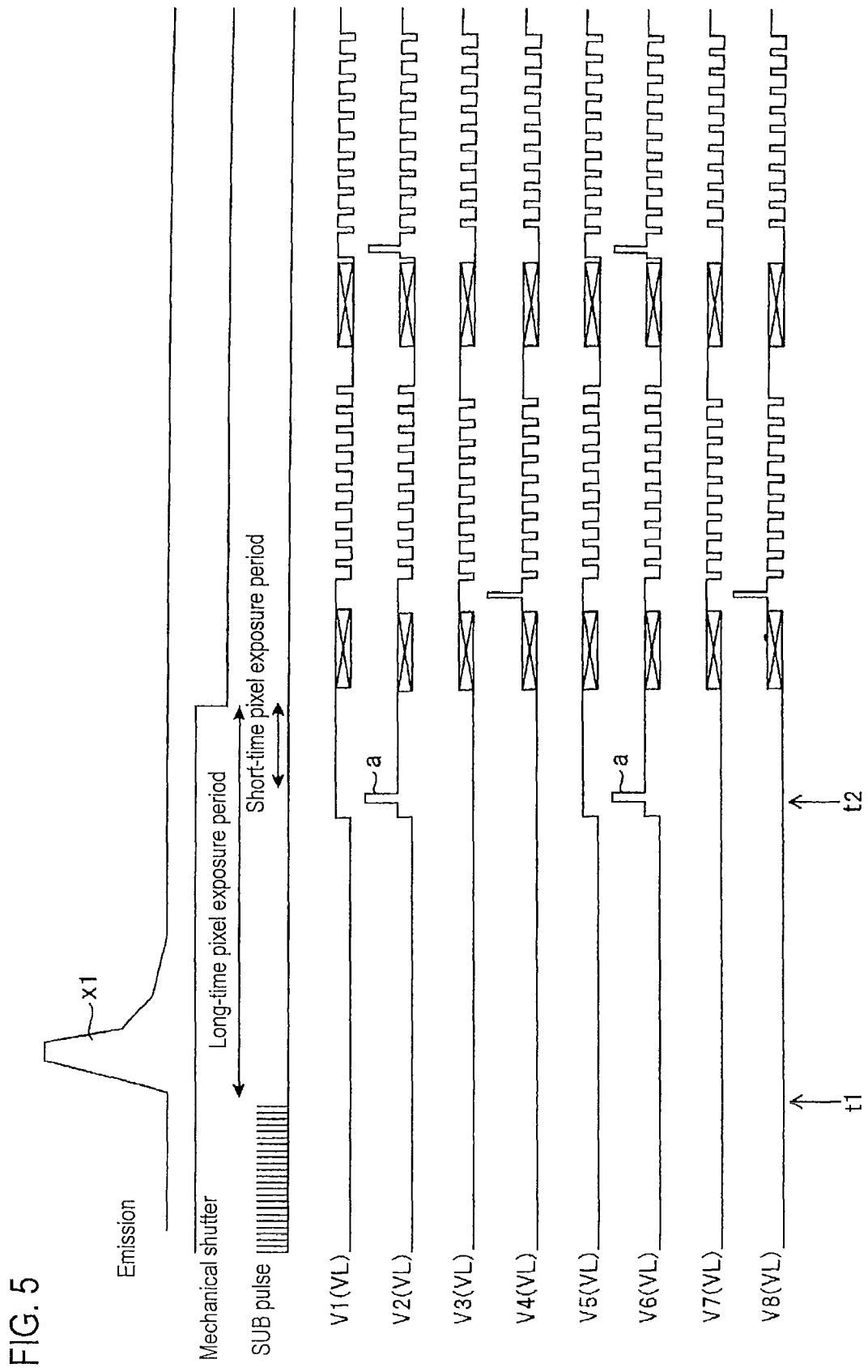
FIG. 5 is a time chart showing the timing of flashlight emission when high-sensitivity double shooting is performed by the solid-state imaging device shown in FIG. 2.

When the shooting mode is the "high-sensitivity double shooting mode", the procedure goes from the step S5 to step S6 in which it is determined as to whether or not flashlight emission is required. If flashlight emission is required, the procedure goes to next step S7 in which synchronous emission x1 on the long-time exposure side shown in FIG. 5 is performed.

That is, the flashlight is emitted in synchronous with the time t1. In the example shown in FIG. 5, charges stored in the short-time exposure pixel group do not contain any charge based on the flashlight emission because the flashlight emission period does not reach the short-time exposure start time t2.

After the flashlight emission is completed, the procedure goes to next step S8 in which a process in the high-sensitivity double shooting mode (which will be described later) is performed. Then, a process of recording the captured image data, which has been subjected to the image processing, is performed (step S9), and the procedure shown in FIG. 4 is terminated. When the determined made in the step S6 concludes that flashlight emission is not required, the procedure goes from the step S6 to the step S8.

Figure 6:
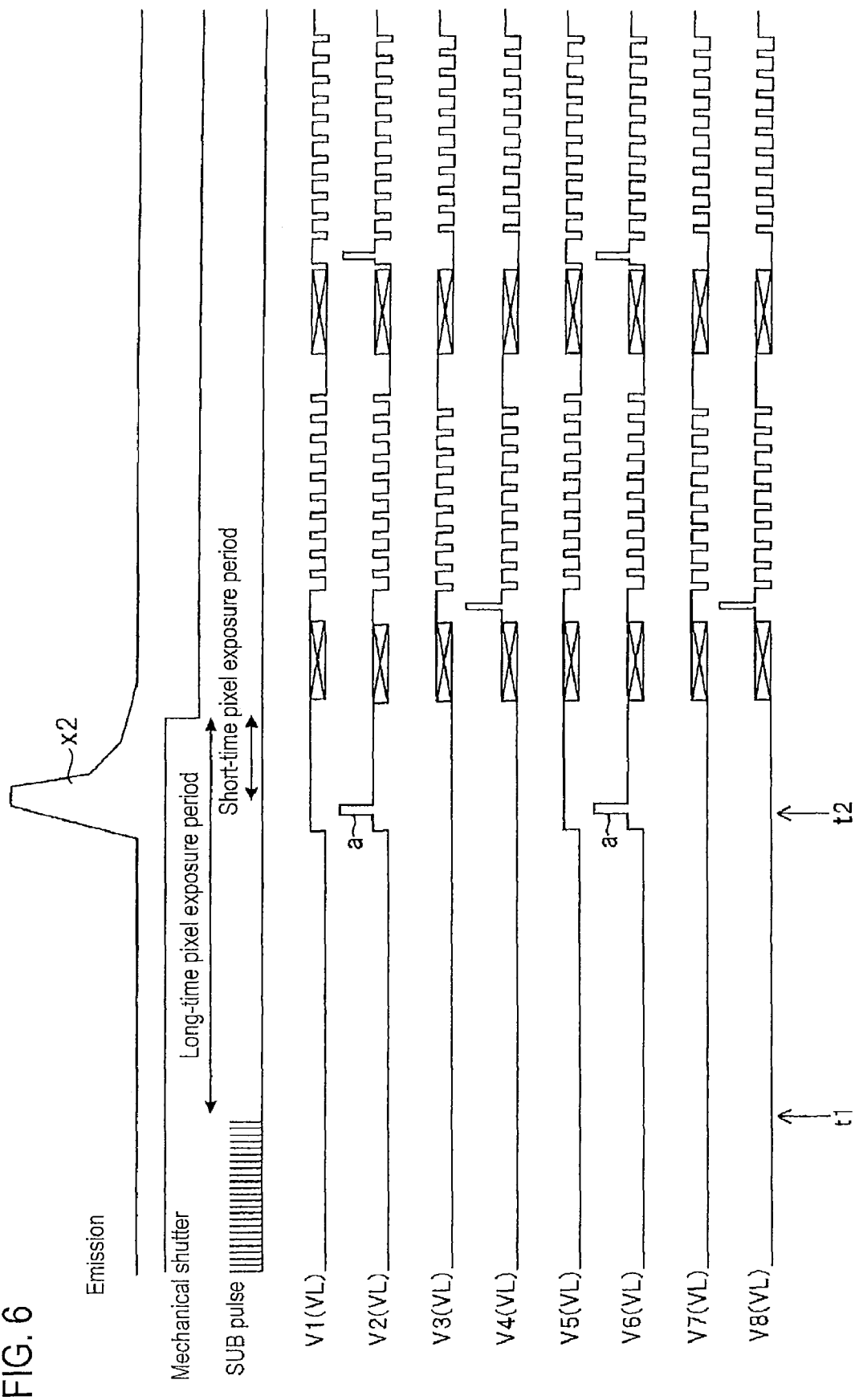
FIG. 6 is a time chart showing the timing of flashlight emission when wide dynamic range shooting is performed by the solid-state imaging device shown in FIG. 2.

If the determination made in the step S5 concludes that the shooting mode is the wide dynamic range shooting mode, the procedure goes from the step S5 to step S10 in which it is determined as to whether or not flashlight emission is required. If flashlight emission is required, the procedure goes to step S11 in which synchronous emission x2 on the short-time exposure side shown in FIG. 6 is performed.

That is, flashlight is emitted in synchronous with the time t2. Signal charge based on the flashlight emission is stored in both the long-time exposure pixel group and the short-time exposure pixel group because the flashlight emission is performed when the long-time exposure period and the short-time exposure period overlap with each other.

After the flashlight emission is completed, the procedure goes to next step S12 in which a process in the wide dynamic range shooting mode (which will be described later) is performed. Then, the process of recording the captured image data, which has been subjected to the image processing, is performed (step S9), and the procedure shown in FIG. 4 is terminated. If the determination made in the step S10 concludes that flashlight emission is not required, the procedure goes from the step S10 to the step S12.

Figure 7:
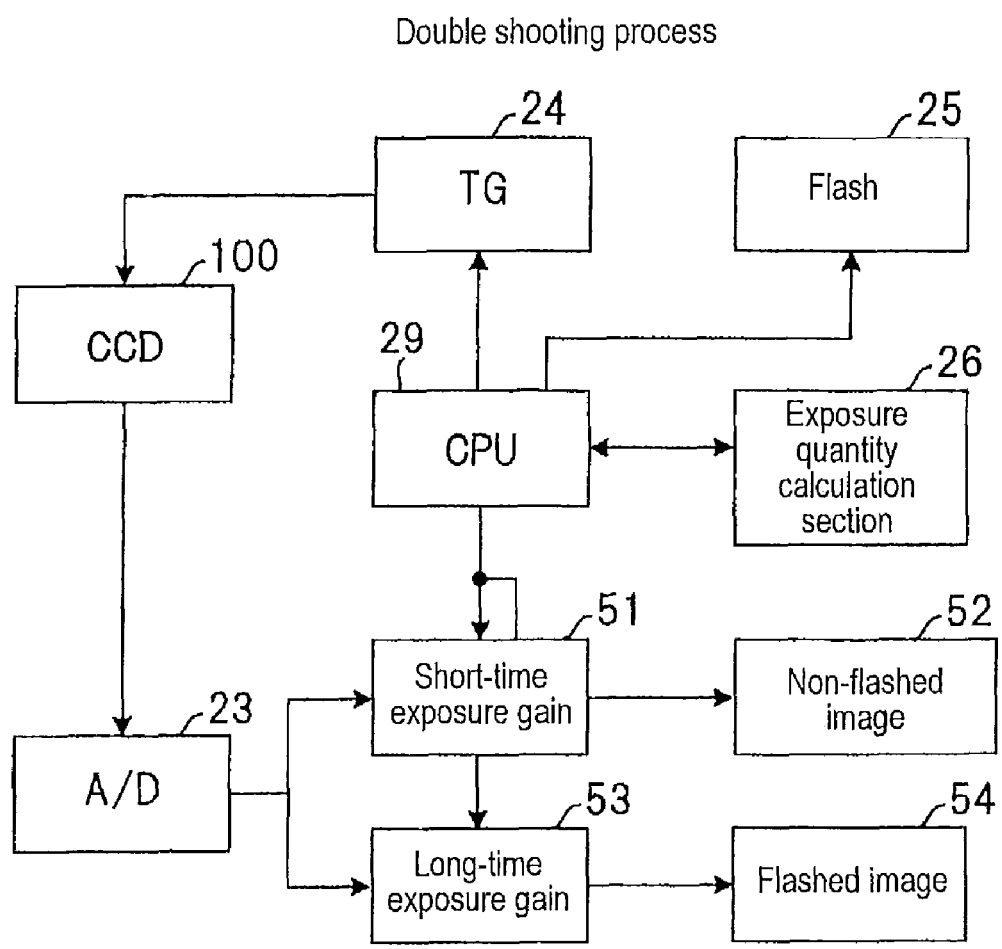
FIG. 7 is a functional block diagram showing processing in the high-sensitivity double shooting mode.

FIG. 7 is a functional block diagram showing the process in the high-sensitivity double shooting mode. The CPU 29 controls the flashlight emission of the flashlight emitting section 25 while driving the solid-state imaging device 100 through the timing generator 24 in accordance with the time chart shown in FIG. 3 by using an exposure quantity calculated by the digital signal processing section 26, which works under the CPU 29.

The solid-state imaging device 100 outputs the captured image data based on the long-time exposure and the captured image data based on the short-time exposure. The A/D conversion section 23 converts the two pieces of captured image data into two pieces of digital data, respectively. The short-time exposure digital data (image data captured without flashlight as shown in FIG. 5) is multiplied by a required gain 51 to thereby generate a non-flashed image 52 (an image captured without flash). On the other hand, the long-time exposure digital data (image data captured with flashlight as shown in FIG. 5) is multiplied by a required gain 53 (having a value different from that of the gain 51) to thereby generate a flashed image 54 (an image captured with flash). The two pieces of images 52 and 54 are stored in a recording medium.

The long-time exposure data is brighter than data that is obtained by multiplying the short-time exposure data by a temporal ratio of the long-time exposure to the short-time exposure because the long time pixel exposure period includes the flashlight emission period (emission period). Therefore, a gain being equal to or larger than this temporal ratio is applied to the short-time exposure data so that the short-time exposure data as well as the long-time exposure data can be controlled to be improved in exposure appropriately. Moreover, in the high-sensitivity double shooting mode according to this embodiment, synchronism can be guaranteed because the long-time exposure period and the short-time exposure period overlap with each other. Accordingly, the time lag between the long-time exposure data and the sort-time exposure data can be eliminated, so that the probability of failed shooting can be reduced.

Figure 8:
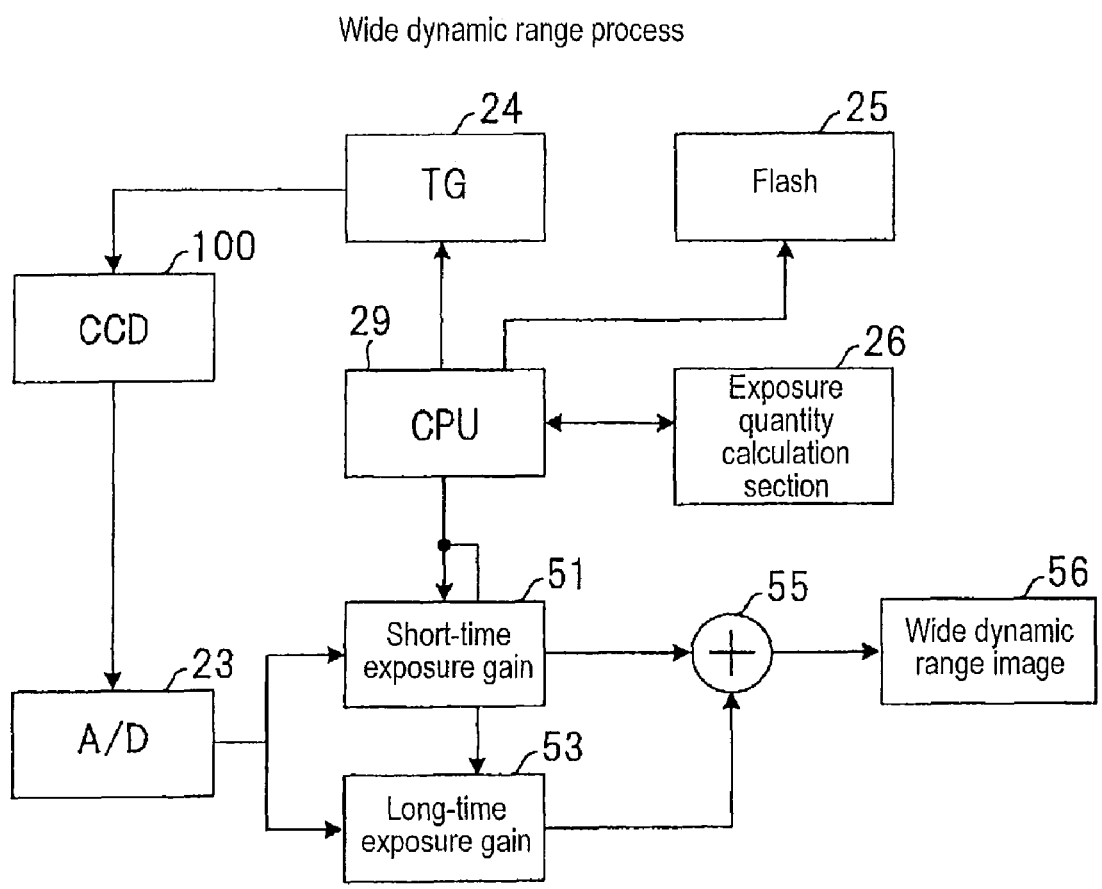
FIG. 8 is a functional block diagram showing processing in the wide dynamic range shooting mode.

FIG. 8 is a functional block diagram showing the process in the wide dynamic range shooting mode. Difference between the wide dynamic range shooting mode and the high-sensitivity double shooting mode shown in FIG. 7 is as follows. After the short-time exposure data is multiplied by the required gain 51 while the long-time exposure data is multiplied by the required gain 53, the resultant two pieces of image data are added (combined) by an adder 55 to thereby generate one piece of image data 56 having a wide dynamic range.

As shown in FIG. 6, in the wide dynamic range shooting mode, flashlight is emitted in synchronous with the short-time exposure start time t2, so that both the long-time exposure data and the short-time exposure data contain data based on the flashlight emission. The short-time exposure data is, however, brighter than data that is obtained by multiplying the long-time exposure data by the temporal ratio of the short-time exposure to the long-time exposure because a ratio of the flashlight emission period to the short-time exposure period is larger than a ratio of the flashlight emission period to the long-time exposure period.

When a gain lower than this temporal ratio of the short-time exposure to the long-time exposure is applied to the short-time exposure data, the short-time exposure data can be controlled to be improved in exposure appropriately so that the composite image data (after combining) can be generated with a proper exposure level. In addition, since both the short-time exposure data and the long-time exposure data contain data based on the same flashlight emission of the same light source, it is easy to adjust white balance for the two pieces of image data so that good white balance can be obtained in the composite image (after combining).

As described above, in the digital camera according to this embodiment, when flashlight emission is synchronized with start of the long-time exposure, the long-time exposure data subjected to flashlight emission and the short-time exposure data not subjected to flashlight emission can be obtained. The two pieces of data can be processed separately, so that two pieces of subject image data can be obtained in the high-sensitivity double shooting.

On the other hand, when the flashlight emission is synchronized with start of the short-time exposure, the flashlight emission condition for long-time exposure data can be made equal to that for short-time exposure data. When the long-time exposure data and the short-time exposure data are combined, one piece of subject image data having a wide dynamic range can be obtained. When the short-time exposure data is multiplied by a gain lower than the temporal ratio of the short-time exposure to the long-time exposure in the combining process, the same wide dynamic range shooting process as in the case where shooting is made without flashlight emission can be performed.

On the other hand, even if the long-time exposure data becomes brighter than the data obtained by multiplying the short-time exposure data by the temporal ratio of the long-time exposure to the short-time exposure because the long-time exposure period contains the flashlight emission period but the short-time exposure period does not contain any flashlight emission period, the short-time exposure data is multiplied by the gain equal to or larger than the temporal ratio of the short-time exposure to the long-time exposure so that an appropriate exposure level can be obtained also in the short-time exposure data.

Similarly, when flashlight emission is synchronized with start of the short-time exposure, an appropriate gain can be applied to the short-time exposure data to obtain an appropriate exposure level for the short-time exposure data though the ratio of the flashlight emission period to the short-time exposure period for the short-time exposure data is higher than the ratio of the flashlight emission period to the long-time exposure period for the long-time exposure data.

Although the aforementioned embodiment has been described on the case where the long-time exposure data is multiplied by a gain, a gain different/gain ratio between the gain for the short-time exposure data and the gain for the long-time exposure data can be controlled appropriately so that the exposure level for the short-time exposure data can be controlled properly.

Figure 9:
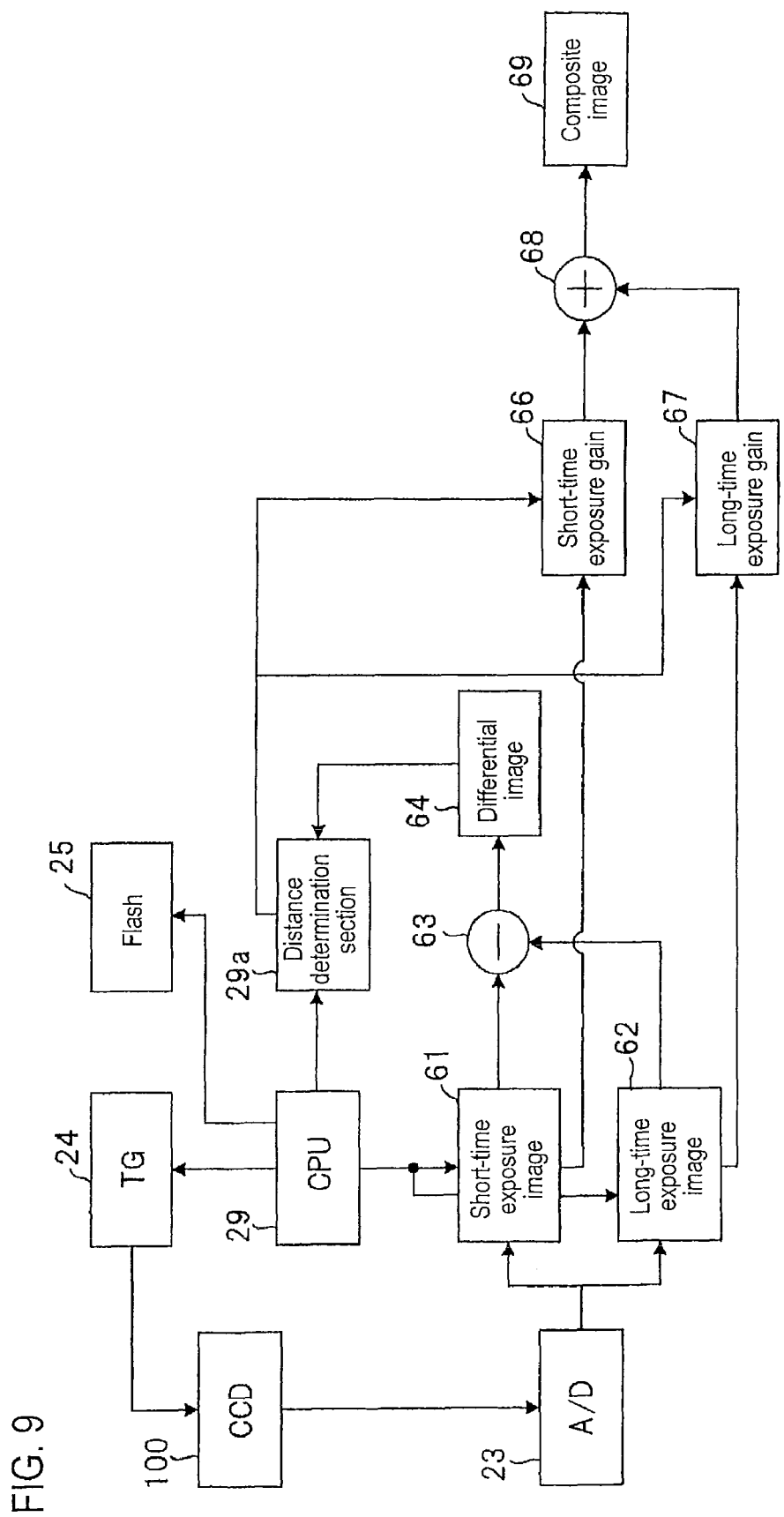
FIG. 9 is a functional block diagram showing processing for combining a non-flashed image and a flashed image.

FIG. 9 is a functional block diagram showing processing in a mode for combining a non-flashed image and a flashed image according to another embodiment of the invention. In this embodiment, a difference between short-time exposure data (non-flashed image data) 61 and long-time exposure data (flashed image data) 62 output from the A/D conversion section 23 is calculated by a subtracter 63 to thereby obtain a differential image 64.

A reflection intensity of flashlight from an object at a short distance is large while but a reflection intensity of flashlight from an object at a long distance is small. For this reason, if two images in one plane are equal in color, a differential image between the two images expresses a "distance" from the digital camera.

Therefore, the short-time exposure data mainly used as a background image at a long distance and the long-time exposure data mainly used as a main subject image at a short distance are combined to generate one piece of image data. Consequently, the S/N of the main subject can be improved while atmosphere of the scene (background image) can be left.

Therefore, a distance determination section 29a of the CPU 29 estimates a "distance" to each image part based on the differential image 64 and separates the background and the main subject from each other in accordance with the estimated distance values. The short-time exposure data is multiplied by a predetermined gain 66 while the long-time exposure data is multiplied by a predetermined gain 67 (having a value different from that of the gain 66). While a combination ratio (mixture ratio) between the short-time exposure data and the long-time exposure data is adjusted in accordance with the estimated distance values, the short-time exposure data and the long-time exposure data are added by an adder 68 to generate a composite image 69.

According to this embodiment, the non-flashed image and the flashed image are combined in the mixture ratio corresponding to the distances to subjects, so that a high S/N image of the main subject can be obtained while the atmosphere of the background image can be left.

Although the solid-state imaging device 100 shown in FIG. 2 has the pixels 101 arranged as a so-called honeycomb pixel array, the high-sensitivity double shooting mode, the wide dynamic range shooting mode and the combination mode shown in FIG. 9 are not limited to the solid-state imaging device having this pixel array, and may be applied to a solid-state imaging device having pixels arranged as a tetragonal lattice array.

Figure 10:
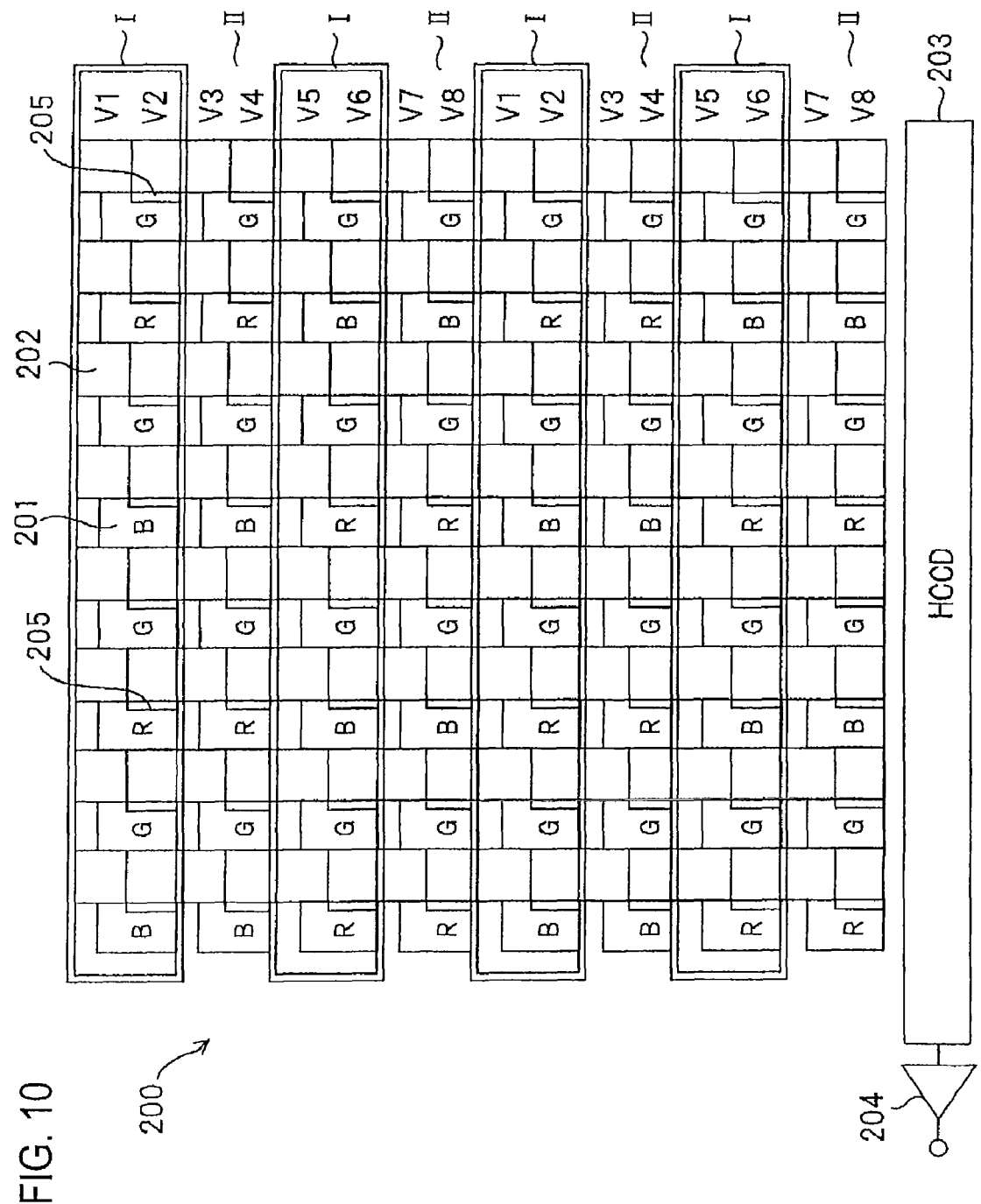
FIG. 10 is a schematic view of a surface of a solid-state imaging device according to a second embodiment of the invention.

FIG. 10 is a schematic view of a surface of a solid-state imaging device 200 having pixels arranged as a tetragonal lattice array according to a second embodiment of the invention. The solid-state imaging device 200 has pixels 201 arranged as a tetragonal lattice array, vertical charge transfer paths 202 formed along respective columns of the pixels, a horizontal charge transfer path 203 formed along respective end portions of the vertical charge transfer paths 202 in the transfer direction, and an output amplifier 204 provided in an output end portion of the horizontal change transfer path 203.

Two transfer electrodes per pixel are provided to form the vertical charge transfer paths. Reading gates 205 are provided in even-numbered transfer electrodes V2, V4, V6 and V8.

In the illustrated example, color filters are arranged so that two rows each having an arrangement "BGRGBGRG . . . " and two rows each having an arrangement "RGBGRGBG . . . " are alternated vertically every two rows. A group of pixels arranged every other row is the first pixel group (or the second pixel group) while a group of the remaining pixels arranged every other row is the second pixel group (or the first pixel group).

The solid-state imaging device 200 configured thus can also perform the same drive and image processing as that in the first embodiment.

Figure 11:
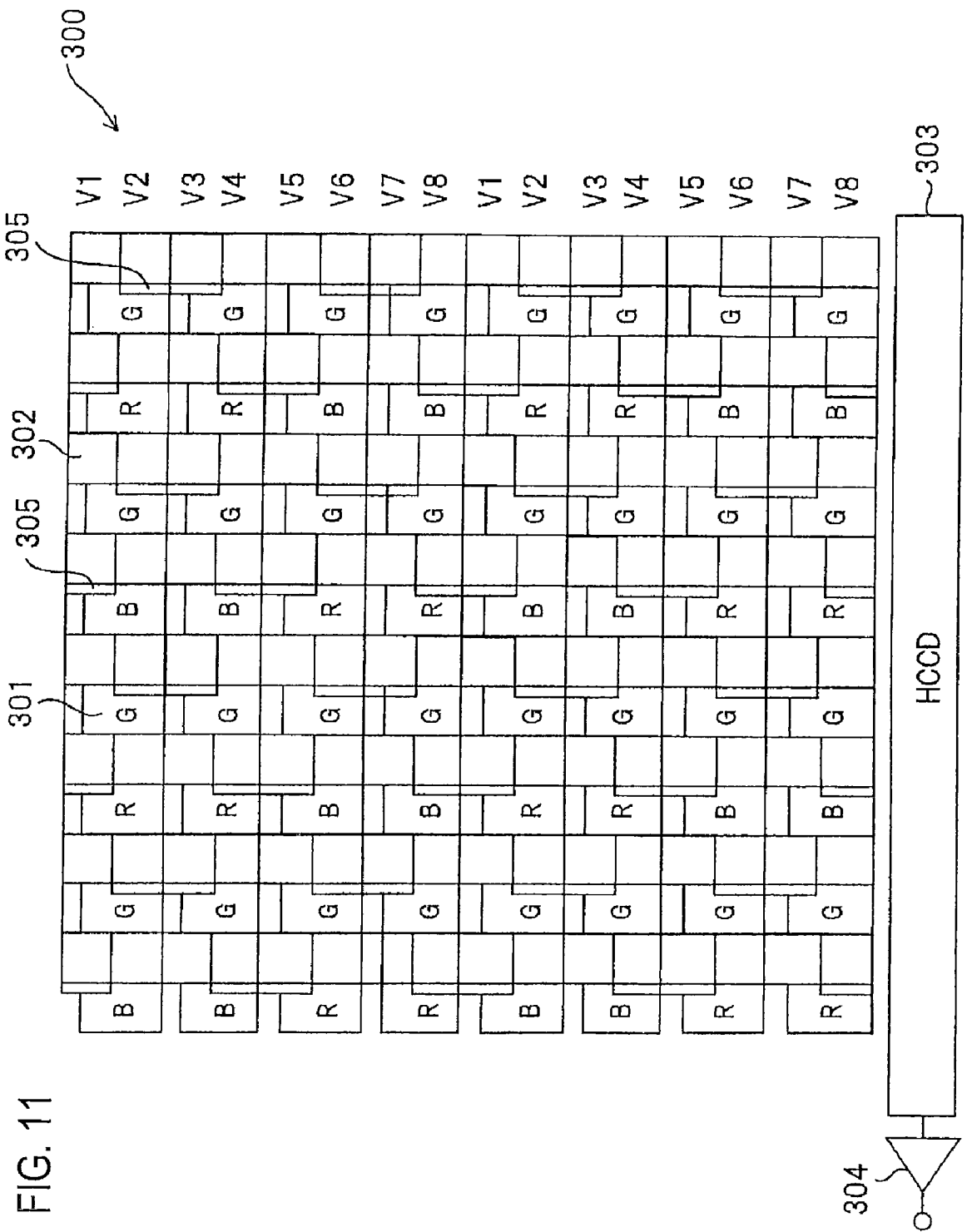
FIG. 11 is a schematic view of a surface of a solid-state imaging device according to a third embodiment of the invention.

FIG. 11 is a schematic view of a surface of a solid-state imaging device 300 having pixels arranged as a tetragonal lattice array according to a third embodiment of the invention.

The solid-state imaging device 300 has the same color filter arrangement as that of the solid-state imaging device 200 shown in FIG. 10.

Difference of the solid-state imaging device 300 from the solid-state imaging device 200 is as follows. Read gates 305 for reading signal charge from respective pixels 301 to vertical charge transfer paths 302 are provided in transfer electrodes (vertically upper and lower transfer electrodes) which vary between pixels horizontally and vertically adjacent to each other. Consequently, among the pixels arranged as a tetragonal lattice array, pixels located in one checkered pattern form a first pixel group (or a second pixel group) while the remaining pixels located in the other checkered pattern form a second pixel group (or a first pixel group).

The solid-state imaging device 300 configured as described above can also perform the same drive and image processing as in the first embodiment.

Although the embodiments have been described on the case where a CCD solid-state imaging device is taken as an example, it is a matter of course that image processing in the high-sensitivity double shooting mode, the wide dynamic range shooting mode and the combination mode shown in FIG. 9 can be performed in the same manner as described above also when the invention is applied to a solid-state imaging device using MOS transistors, not charge transfer paths, as a signal reading method.

The solid-state imaging device driving method and the image processing method according to the invention are useful for application to a digital camera or the like because the probability of failed shooting can be reduced and a subject image can be obtained with a wide dynamic range even when flashlight emission is used.

What is claimed is:

1. An imaging apparatus comprising:
   a solid-state imaging device including a plurality of pixels that are formed and arranged as a two-dimensional array in a surface of a semiconductor substrate, wherein the plurality of pixels include
   a first pixel group having pixels that are arranged cyclically, and
   a second pixel group being different from the first pixel group and having pixels that are arranged cyclically;
   an imaging device driving unit that exposes the first pixel group during a first exposure period, exposes the second pixel group during a second exposure period that is a part of the first exposure period, and reads from the solid-state imaging device first image data captured by the first pixel group and second image data captured by the second pixel group separately; and
   a signal processing unit that performs image processing for the first and second image data read from the solid-state imaging device, wherein
   a first shooting mode and a second shooting mode are provided,
   in the first shooting mode, the signal processing unit performs the image processing for the first and second image data separately to generate two pieces of subject image data, and
   in the second shooting mode, the signal processing unit combines the second image data with the first image data to generate one piece of subject image data,
   a flashlight emitting unit that is operated in the first shooting mode so as to emit flashlight during a period in which the first exposure period does not overlap with the second exposure period, and is operated in the second shooting mode so as to emit flashlight during a period in which the first exposure period overlaps with the second exposure period wherein when the flashlight is emitted, the signal processing unit corrects the second image data with a gain that is equal to or larger than a temporal ratio of the second exposure period to the first exposure period.

2. An imaging apparatus comprising:
a solid-state imaging device including a plurality of pixels that are formed and arranged as a two-dimensional array in a surface of a semiconductor substrate, wherein the plurality of pixels include
a first pixel group having pixels that are arranged cyclically, and
a second pixel group being different from the first pixel group and having pixels that are arranged cyclically;
an imaging device driving unit that exposes the first pixel group during a first exposure period, exposes the second pixel group during a second exposure period that is a part of the first exposure period, and reads from the solid-state imaging device first image data captured by the first pixel group and second image data captured by the second pixel group separately; and
a signal processing unit that performs image processing for the first and second image data read from the solid-state imaging device, wherein
a first shooting mode and a second shooting mode are provided,
in the first shooting mode, the signal processing unit performs the image processing for the first and second image data separately to generate two pieces of subject image data, and
in the second shooting mode, the signal processing unit combines the second image data with the first image data to generate one piece of subject image data, wherein the signal processing unit calculates a differential image between the two pieces of subject image data when the two pieces of subject image data are obtained in the first shooting mode,
wherein the signal processing unit combines the two pieces of subject image data based on the differential image to generate one piece of subject image data,
wherein the signal processing unit calculates distances to respective image parts based on the differential image and combines the two pieces of subject image data by using a mixture ratio corresponding to the calculated distances.

3. The imaging apparatus according to claims 1 or 2, further comprising: a mode selection switch that selects one mode from the first and second shooting modes.

4. The imaging apparatus according to claim 1 or 2, further comprising: a mechanical shutter that terminates the first and second exposure periods simultaneously.

5. An image signal processing method for use in an imaging apparatus including:
a solid-state imaging device including a plurality of pixels that are formed and arranged as a two-dimensional array in a surface of a semiconductor substrate, wherein the plurality of pixels include:
a first pixel group having pixels that are arranged cyclically, and
a second pixel group being different from the first pixel group and having pixels that are arranged cyclically,
an imaging device driving unit that exposes the first pixel group during a first exposure period, exposes the second pixel group during a second exposure period that is a part of the first exposure period, and reads from the solid-state imaging device first image data captured by the first pixel group and second image data captured by the second pixel group separately, and a signal processing unit that performs image processing for the first and second image data read from the solid-state imaging device, the method comprising:
causing the imaging apparatus to operate a first mode or a second mode, wherein
in the first mode, the signal processing unit performs the image processing for the first and second image data separately to generate two pieces of subject image data, and
in the second mode, the signal processing unit combines the second image data with the first image data to generate one piece of subject image data
further comprising:
emitting flashlight during a period in which the first exposure period does not overlap with the second exposure period when the imaging apparatus operates in the first mode,
emitting flashlight during a period in which the first exposure period overlaps with the second exposure period when the imaging apparatus operates in the second mode; and
correcting the second image data with a gain that is equal to or larger than a temporal ratio of the second exposure period to the first exposure period, when the flashlight is emitted.

6. An image signal processing method for use in an imaging apparatus including:
a solid-state imaging device including a plurality of pixels that are formed and arranged as a two-dimensional array in a surface of a semiconductor substrate, wherein the plurality of pixels include:
a first pixel group having pixels that are arranged cyclically, and
a second pixel group being different from the first pixel group and having pixels that are arranged cyclically,
an imaging device driving unit that exposes the first pixel group during a first exposure period, exposes the second pixel group during a second exposure period that is a part of the first exposure period, and reads from the solid-state imaging device first image data captured by the first pixel group and second image data captured by the second pixel group separately, and
a signal processing unit that performs image processing for the first and second image data read from the solid-state imaging device, the method comprising:
causing the imaging apparatus to operate a first mode or a second mode, wherein
in the first mode, the signal processing unit pedal, ins the image processing for the first and second image data separately to generate two pieces of subject image data, and
in the second mode, the signal processing unit combines the second image data with the first image data to generate one piece of subject image data, further comprising:
calculating a differential image between the two pieces of subject image data when the two pieces of subject image data are obtained in the first mode;
combining the two pieces of subject image data based on the differential image to generate one piece of subject image data, and
calculating distances to respective image parts based on the differential image; and combining the two pieces of subject image data by using a mixture ratio corresponding to the calculated distances.

* * * * *